United States Patent
Shastry et al.

(10) Patent No.: US 12,229,313 B1
(45) Date of Patent: Feb. 18, 2025

(54) SYSTEMS AND METHODS FOR ANALYZING SPEECH DATA TO REMOVE SENSITIVE DATA

(71) Applicant: Truleo, Inc., New York, NY (US)

(72) Inventors: Tejas Shastry, Chicago, IL (US); Anthony Tassone, St. Charles, IL (US); Corey Burrows, Lisle, IL (US)

(73) Assignee: Truleo, Inc., New York, NY (US)

( * ) Notice: Subject to any disclaimer, the term of this patent is extended or adjusted under 35 U.S.C. 154(b) by 0 days.

(21) Appl. No.: 18/778,183

(22) Filed: Jul. 19, 2024

Related U.S. Application Data

(60) Provisional application No. 63/514,515, filed on Jul. 19, 2023.

(51) Int. Cl.
| | |
|---|---|
| *H04L 29/06* | (2006.01) |
| *G06F 21/62* | (2013.01) |
| *G06V 20/40* | (2022.01) |
| *G10L 17/02* | (2013.01) |
| *G10L 17/04* | (2013.01) |
| *G10L 25/57* | (2013.01) |
| *G11B 27/031* | (2006.01) |

(52) U.S. Cl.
CPC .......... *G06F 21/6245* (2013.01); *G06V 20/41* (2022.01); *G10L 17/02* (2013.01); *G10L 17/04* (2013.01); *G10L 25/57* (2013.01); *G11B 27/031* (2013.01)

(58) Field of Classification Search
None
See application file for complete search history.

(56) References Cited

U.S. PATENT DOCUMENTS

| | | |
|---|---|---|
| 3,296,374 A | 1/1967 | Clapper |
| 7,409,349 B2 | 8/2008 | Wang et al. |
| 7,447,654 B2 | 11/2008 | Ben-Levy et al. |
| 7,475,046 B1 | 1/2009 | Foley et al. |

(Continued)

FOREIGN PATENT DOCUMENTS

| | | |
|---|---|---|
| WO | WO-2022133125 A1 | 6/2022 |
| WO | WO-2024097345 A1 | 5/2024 |

OTHER PUBLICATIONS

Co-pending U.S. Appl. No. 18/738,819 inventor Tejas Shastry et al., filed Jun. 10, 2024.

(Continued)

*Primary Examiner* — Shin-Hon (Eric) Chen

(57) ABSTRACT

According to an embodiment, a method includes receiving audio data and providing the audio data as input to a first machine learning model to produce transcription data. The audio data is provided as input to a second machine learning model to produce speaker separation data, and the transcription data is segmented based on the speaker separation data to produce speaker separated transcription data. A portion of the speaker separated transcription data is provided as input to a third machine learning model to identify personal identifiable information (PII) text in the portion of the speaker separated transcription data, the portion being associated with a speaker from a plurality of speakers. The method also includes replacing the PII text with redaction text in the portion of the speaker separated transcription data and causing display of the transcription data including the redaction text at a user compute device.

21 Claims, 10 Drawing Sheets

(56) References Cited

U.S. PATENT DOCUMENTS

| | | | |
|---|---|---|---|
| 7,533,054 B2 | 5/2009 | Hausman et al. | |
| 7,536,335 B1 | 5/2009 | Weston et al. | |
| 7,610,547 B2 | 10/2009 | Wang et al. | |
| 7,643,998 B2 | 1/2010 | Yuen et al. | |
| 7,685,048 B1 | 3/2010 | Hausman et al. | |
| 7,689,495 B1 | 3/2010 | Kim et al. | |
| 7,774,247 B2 | 8/2010 | Hausman et al. | |
| 7,822,672 B2 | 10/2010 | Hausman | |
| 8,019,665 B2 | 9/2011 | Hausman | |
| 8,099,352 B2 | 1/2012 | Berger et al. | |
| 8,321,465 B2 | 11/2012 | Farber et al. | |
| 8,332,384 B2 | 12/2012 | Kemp | |
| 8,438,158 B2 | 5/2013 | Kemp | |
| 8,442,823 B2 | 5/2013 | Jeon et al. | |
| 8,473,396 B2 | 6/2013 | Hausman et al. | |
| 8,489,587 B2 | 7/2013 | Kemp | |
| 8,504,483 B2 | 8/2013 | Foley et al. | |
| 8,676,679 B2 | 3/2014 | Hausman et al. | |
| 8,788,397 B2 | 7/2014 | Berger et al. | |
| 8,799,140 B1 | 8/2014 | Toffee et al. | |
| 8,878,853 B2 | 11/2014 | Baransky et al. | |
| 8,909,516 B2 | 12/2014 | Medero et al. | |
| 8,965,765 B2 | 2/2015 | Zweig et al. | |
| 9,313,173 B2 | 4/2016 | Davis et al. | |
| 9,330,659 B2 | 5/2016 | Ju et al. | |
| 9,613,026 B2 | 4/2017 | Hodson | |
| 9,728,184 B2 | 8/2017 | Xue et al. | |
| 9,760,566 B2 | 9/2017 | Heck et al. | |
| 9,824,698 B2 | 11/2017 | Jerauld | |
| 9,870,424 B2 | 1/2018 | Neystadt et al. | |
| 9,906,474 B2 | 2/2018 | Robarts et al. | |
| 10,002,520 B2 | 6/2018 | Bohlander et al. | |
| 10,108,306 B2 | 10/2018 | Khoo et al. | |
| 10,185,989 B2 | 1/2019 | Ritter et al. | |
| 10,192,277 B2 | 1/2019 | Hanchett et al. | |
| 10,210,869 B1 | 2/2019 | King et al. | |
| 10,237,716 B2 | 3/2019 | Bohlander et al. | |
| 10,237,822 B2 | 3/2019 | Hanchett et al. | |
| 10,298,875 B2 | 5/2019 | Klein et al. | |
| 10,354,169 B1 | 7/2019 | Law et al. | |
| 10,354,350 B2 | 7/2019 | Nakfour et al. | |
| 10,368,225 B2 | 7/2019 | Hassan et al. | |
| 10,372,755 B2 | 8/2019 | Blanco | |
| 10,381,024 B2 | 8/2019 | Tan et al. | |
| 10,405,786 B2 | 9/2019 | Sahin | |
| 10,417,340 B2 | 9/2019 | Applegate et al. | |
| 10,419,312 B2 | 9/2019 | Alazraki et al. | |
| 10,460,746 B2 | 10/2019 | Costa et al. | |
| 10,477,375 B2 | 11/2019 | Bohlander et al. | |
| 10,509,988 B2 | 12/2019 | Woulfe et al. | |
| 10,534,497 B2 | 1/2020 | Khoo et al. | |
| 10,586,556 B2 | 3/2020 | Caskey et al. | |
| 10,594,795 B2 | 3/2020 | Hanchett et al. | |
| 10,630,560 B2 | 4/2020 | Adylov et al. | |
| 10,657,962 B2 | 5/2020 | Zhang et al. | |
| 10,685,075 B2 | 6/2020 | Blanco et al. | |
| 10,713,497 B2 | 7/2020 | Womack et al. | |
| 10,720,169 B2 | 7/2020 | Reitz et al. | |
| 10,728,384 B1 * | 7/2020 | Channakeshava | G06F 21/6245 |
| 10,755,729 B2 | 8/2020 | Dimino, Jr. et al. | |
| 10,779,022 B2 | 9/2020 | MacDonald | |
| 10,779,152 B2 | 9/2020 | Bohlander et al. | |
| 10,785,610 B2 | 9/2020 | Bohlander et al. | |
| 10,796,393 B2 | 10/2020 | Messerges et al. | |
| 10,805,576 B2 | 10/2020 | Hanchett et al. | |
| 10,825,479 B2 | 11/2020 | Hershfield et al. | |
| 10,848,717 B2 | 11/2020 | Hanchett et al. | |
| 10,853,435 B2 | 12/2020 | Reitz et al. | |
| 10,872,636 B2 | 12/2020 | Smith et al. | |
| 11,120,199 B1 * | 9/2021 | Bachtiger | G06F 40/284 |
| 11,138,970 B1 * | 10/2021 | Han | G06F 21/6245 |
| 11,423,911 B1 | 8/2022 | Fu et al. | |
| 11,706,391 B1 | 7/2023 | Heywood et al. | |
| 11,947,872 B1 * | 4/2024 | Mahler-Haug | G06Q 10/10 |
| 11,948,555 B2 | 4/2024 | Christie et al. | |
| 12,014,750 B2 | 6/2024 | Shastry et al. | |
| 12,062,368 B1 * | 8/2024 | Arora | G10L 15/063 |
| 2007/0117073 A1 | 5/2007 | Walker et al. | |
| 2007/0167689 A1 | 7/2007 | Ramadas et al. | |
| 2009/0155751 A1 | 6/2009 | Paul et al. | |
| 2009/0292638 A1 | 11/2009 | Hausman | |
| 2010/0121880 A1 | 5/2010 | Ursitti et al. | |
| 2010/0332648 A1 | 12/2010 | Bohus et al. | |
| 2011/0270732 A1 | 11/2011 | Ritter et al. | |
| 2012/0004914 A1 | 1/2012 | Strom et al. | |
| 2013/0156175 A1 | 6/2013 | Bekiares et al. | |
| 2013/0173247 A1 | 7/2013 | Hodson | |
| 2013/0300939 A1 | 11/2013 | Chou et al. | |
| 2014/0006248 A1 | 1/2014 | Toffee | |
| 2014/0081823 A1 | 3/2014 | Phadnis et al. | |
| 2014/0101739 A1 | 4/2014 | Li et al. | |
| 2014/0187190 A1 | 7/2014 | Schuler et al. | |
| 2014/0207651 A1 | 7/2014 | Toffey et al. | |
| 2015/0310729 A1 | 10/2015 | Lampert et al. | |
| 2015/0310730 A1 | 10/2015 | Miller et al. | |
| 2015/0310862 A1 | 10/2015 | Dauphin et al. | |
| 2015/0381933 A1 | 12/2015 | Cunico et al. | |
| 2016/0066085 A1 | 3/2016 | Chang et al. | |
| 2016/0180737 A1 | 6/2016 | Clark et al. | |
| 2017/0132703 A1 | 5/2017 | Oomman et al. | |
| 2017/0316775 A1 | 11/2017 | Le et al. | |
| 2017/0346904 A1 | 11/2017 | Fortna et al. | |
| 2017/0364602 A1 | 12/2017 | Reitz et al. | |
| 2018/0107943 A1 | 4/2018 | White et al. | |
| 2018/0197548 A1 * | 7/2018 | Palakodety | G10L 17/06 |
| 2018/0233139 A1 | 8/2018 | Finkelstein et al. | |
| 2018/0350389 A1 | 12/2018 | Garrido et al. | |
| 2019/0019297 A1 | 1/2019 | Lim et al. | |
| 2019/0042988 A1 | 2/2019 | Brown et al. | |
| 2019/0096428 A1 * | 3/2019 | Childress | G10L 25/57 |
| 2019/0108270 A1 | 4/2019 | Dunne et al. | |
| 2019/0121907 A1 | 4/2019 | Brunn et al. | |
| 2019/0139438 A1 | 5/2019 | Tu et al. | |
| 2019/0188814 A1 | 6/2019 | Kreitzer et al. | |
| 2019/0258700 A1 | 8/2019 | Beaver et al. | |
| 2019/0318725 A1 | 10/2019 | Le Roux et al. | |
| 2020/0104698 A1 | 4/2020 | Ladvocat Cintra | |
| 2020/0195726 A1 | 6/2020 | Hanchett et al. | |
| 2020/0210907 A1 | 7/2020 | Ulizio et al. | |
| 2020/0302043 A1 | 9/2020 | Vachon | |
| 2020/0342857 A1 | 10/2020 | Moreno et al. | |
| 2020/0365136 A1 | 11/2020 | Candelore et al. | |
| 2021/0092224 A1 | 3/2021 | Rule et al. | |
| 2021/0337307 A1 * | 10/2021 | Wexler | G06V 40/161 |
| 2021/0374601 A1 | 12/2021 | Liu et al. | |
| 2022/0115022 A1 | 4/2022 | Sharifi et al. | |
| 2022/0122615 A1 | 4/2022 | Chen et al. | |
| 2022/0189501 A1 | 6/2022 | Shastry et al. | |
| 2022/0310109 A1 | 9/2022 | Donsbach et al. | |
| 2023/0103060 A1 | 3/2023 | Chaudhuri et al. | |
| 2023/0186950 A1 * | 6/2023 | Vanciu | G11B 20/10 375/316 |
| 2023/0215439 A1 * | 7/2023 | Kanda | G10L 15/06 704/235 |
| 2023/0223038 A1 | 7/2023 | Shastry et al. | |
| 2023/0419950 A1 * | 12/2023 | Khare | G10L 15/01 |
| 2024/0169854 A1 | 5/2024 | Shastry et al. | |
| 2024/0256592 A1 * | 8/2024 | O'Neill | G06F 16/483 |
| 2024/0331721 A1 | 10/2024 | Shastry et al. | |

OTHER PUBLICATIONS

Final Office Action for U.S. Appl. No. 18/180,652 mailed Oct. 13, 2023, 34 pages.
International Preliminary Report on Patentability for International Application No. PCT/US2021/063873 mailed Jun. 29, 2023, 10 pages.
International Search Report and Written Opinion for PCT Application No. PCT/US2021/063873 mailed Mar. 10, 2022, 11 pages.
International Search Report and Written Opinion for PCT Application No. PCT/US2023/036686 mailed Feb. 22, 2024, 8 pages.
Non-Final Office Action for U.S. Appl. No. 17/553,482 mailed Dec. 12, 2023, 12 pages.

(56) References Cited

OTHER PUBLICATIONS

Non-Final Office Action for U.S. Appl. No. 18/180,652 mailed Jul. 20, 2023, 19 pages.
Non-Final Office Action for U.S. Appl. No. 18/180,652 mailed Mar. 13, 2024, 15 pages.
Notice of Allowance for U.S. Appl. No. 18/180,652 mailed Apr. 11, 2024, 14 pages.
Voigt, R. et al., "Language from police body camera footage shows racial disparities in officer respect," Proceedings of the National Academy of Sciences, Jun. 20, 2017, 114(25), pp. 6521-6526.

* cited by examiner

900

Receive video data that includes audio data and provide the audio data as input to a first machine learning model to produce transcription data
902

Provide the audio data as input to a second machine learning model to produce speaker separation data
904

Segment the transcription data based on the speaker separation data to produce speaker separated transcription data
906

Provide a portion of the speaker separated transcription data from a plurality of portions of the speaker separated transcription data as input to a context window of a third machine learning model to produce an attribute indication
908

Cause display of video data at a user compute device
910

```
┌─────────────────────────────────────────────────────────────┐
│ Receive video data that includes audio data and provide the │
│ audio data as input to a first machine learning model to    │
│ produce transcription data                                  │
│ 1002                                                        │
└─────────────────────────────────────────────────────────────┘
                              │
                              ▼
┌─────────────────────────────────────────────────────────────┐
│ Provide the audio data as input to a second machine         │
│ learning model to produce speaker separation data           │
│ 1004                                                        │
└─────────────────────────────────────────────────────────────┘
                              │
                              ▼
┌─────────────────────────────────────────────────────────────┐
│ Segment the transcription data based on the speaker         │
│ separation data to produce speaker separated transcription  │
│ data                                                        │
│ 1006                                                        │
└─────────────────────────────────────────────────────────────┘
                              │
                              ▼
┌─────────────────────────────────────────────────────────────┐
│ Provide a portion of the speaker separated transcription    │
│ data from a plurality of portions of the speaker separated  │
│ transcription data as input to a context window of a third  │
│ machine learning model to identify personal identifiable    │
│ information (PII) text in the portion of the speaker        │
│ separated transcription data                                │
│ 1008                                                        │
└─────────────────────────────────────────────────────────────┘
                              │
                              ▼
┌─────────────────────────────────────────────────────────────┐
│ Replace the PII text with redaction text in the portion of  │
│ the speaker separated transcription data                    │
│ 1010                                                        │
└─────────────────────────────────────────────────────────────┘
                              │
                              ▼
┌─────────────────────────────────────────────────────────────┐
│ Cause display of the transcription data including the       │
│ redaction text at a user compute device                     │
│ 1012                                                        │
└─────────────────────────────────────────────────────────────┘
```

FIG. 10

SYSTEMS AND METHODS FOR ANALYZING SPEECH DATA TO REMOVE SENSITIVE DATA

CROSS-REFERENCE TO RELATED APPLICATIONS

This application claims priority to and the benefit of U.S. Provisional Patent Application No. 63/514,515, filed Jul. 19, 2023, and titled "RAPID REVIEW AND VERIFICATION OF OFFICER BEHAVIOR," which is incorporated herein by reference in its entirety.

FIELD

At least some systems and methods described herein relate to identifying attributes of video data and analyzing speech data to remove personal identifiable information (PII) associated with video data.

BACKGROUND

In some instances, body worn cameras (BWC) worn by patrol officers (and/or the like) can produce, for example, hundreds of hours of video per month. These videos can be represented by a significant amount of data, which can hamper and/or limit review by police departments (and/or the like). In at least one embodiment, supervisors (e.g., sergeants and/or lieutenants) can be interested in reviewing BWC videos associated with individual officers to analyze individual encounters. For example, a supervisor may want to analyze (1) at-risk officer behavior, such as an officer uttering below standard language (e.g., profanity, foul language, cursing, etc.), and/or (2) events, such as threats (e.g., threats of force, threats of arrest and/or confinement, etc.) and/or a use of force. However, the sheer quantity of data makes it difficult for supervisors to review available video content to identify and/or analyze videos of interest. Moreover, some videos of interest can include sensitive information (e.g., personal identifiable information (PII) uttered by a community member that is conversing with the patrol officer and that is recorded within the video data). There is a need, therefore, for systems and methods configured to identify videos of interest, facilitate human review of videos of interest, and/or protect PII captured in video data.

SUMMARY

According to an embodiment, an apparatus includes a processor and a memory that is operably coupled to the processor. The memory stores instructions to cause the processor to receive video data that includes audio data and provide the audio data as input to a first machine learning model to produce transcription data. The audio data is provided as input to a second machine learning model to produce speaker separation data, and the transcription data is segmented based on the speaker separation data to produce speaker separated transcription data. The instructions also cause the processor to provide a portion of the speaker separated transcription data from a plurality of portions of the speaker separated transcription data as input to a context window of a third machine learning model to produce an attribute indication. The portion is associated with a speaker from a plurality of speakers and not with remaining speakers from the plurality of speakers. In response to producing the attribute indication, video data is caused to be displayed at a user compute device, the video data being associated with the portion of the speaker separated transcription data and not the remaining portions of the speaker separated transcription data.

According to an embodiment, a method includes receiving, via a processor, audio data, and providing, via the processor, the audio data as input to a first machine learning model to produce transcription data. The audio data is provided via the processor as input to a second machine learning model to produce speaker separation data, and the transcription data is segmented via the processor and based on the speaker separation data to produce speaker separated transcription data. The method also includes providing, via the processor, a portion of the speaker separated transcription data as input to a third machine learning model to identify personal identifiable information (PII) text in the portion of the speaker separated transcription data. The portion is associated with a speaker from a plurality of speakers. In response to identifying the PII text, the method includes (1) replacing, via the processor, the PII text with redaction text in the portion of the speaker separated transcription data and (2) causing, via the processor, display of the transcription data including the redaction text at a user compute device.

According to an embodiment, a method includes receiving audio data via a processor and providing the audio data as input via the processor to a first machine learning model to produce transcription data. The method also includes providing the audio data via the processor as input to a second machine learning model to produce speaker separation data. The transcription data is segmented, via the processor, based on the speaker separation data to produce speaker separated transcription data. A portion of the speaker separated transcription data is provided via the processor as input to a context window of a third machine learning model to produce an attribute indication. The second portion is associated with a speaker from a plurality of speakers and not with remaining speakers from the plurality of speakers. In response to producing the attribute indication, the method includes causing, via the processor, display of video data at a user compute device, the video data being associated with the audio data.

BRIEF DESCRIPTION OF THE DRAWINGS

FIG. 9 shows a flowchart illustrating a method that is implemented by a video analysis system to generate an attribute indication, according to an embodiment.

FIG. 10 shows a flowchart illustrating a method that is implemented by a video analysis system to replace PII text with redaction text, according to an embodiment.

DETAILED DESCRIPTION

At least some systems and methods described herein relate to analysis of audio, such as from video tracks and/or real-time interactions from audio or video recordings. At least some examples provided herein relate to body cameras (also referred to herein as body worn cameras and/or body cams) and/or peace officers (e.g., law enforcement officers, military personnel, police officers, first responders, private security personnel, and/or the like). While at least some examples described herein are in the context of policing, it should be appreciated that at least some systems and methods described herein can be applied in scenarios that do not involve police officers (and/or the like), that include and/or relate to cameras that are not body worn, etc. For example, a body cam can be worn by an emergency technician, a firefighter, a security guard, a citizen instead of a police officer, police during interview of a suspect, interactions in a jail or prison (e.g., between guards and inmates or between inmates), and/or the like. Additionally, a camera can be worn by an animal or be positioned on or in an object, such as a home or vehicle. Moreover, at least some systems and methods described herein can relate to, for example, conversations within sales teams, conversations involving financial transactions, conversations between counterparties where one party may be privy to valuable information that they cannot share with the other, and/or conversations between counterparties where one holds a degree of power (legal, authoritative, managerial, fiduciary, etc.) over another.

As described further herein, some police departments (and/or the like) may wish to adopt a "four-eyes" policy on officer risk, where machine-detected risk events are reviewed and verified by a supervisor. According to at least one embodiment, a rapid risk verification interface (also referred to herein as a review interface or a user interface) that implements a four-eyes policy is described herein. The rapid risk verification interface can provide an inbox of risk that includes risk labels that have not been verified. In at least one instance, for example, risk labels that have not been verified can be reviewed by a supervisor by automatically playing videos starting at a segment before the segment in question, avoiding the need for a supervisor to manually find a relevant point in time where risk is present. The rapid risk verification interface can present the supervisor with a segment the supervisor can evaluate and then respond and or label, for example, with "yes", "no", "not officer", "skip", etc.

Figure 1:
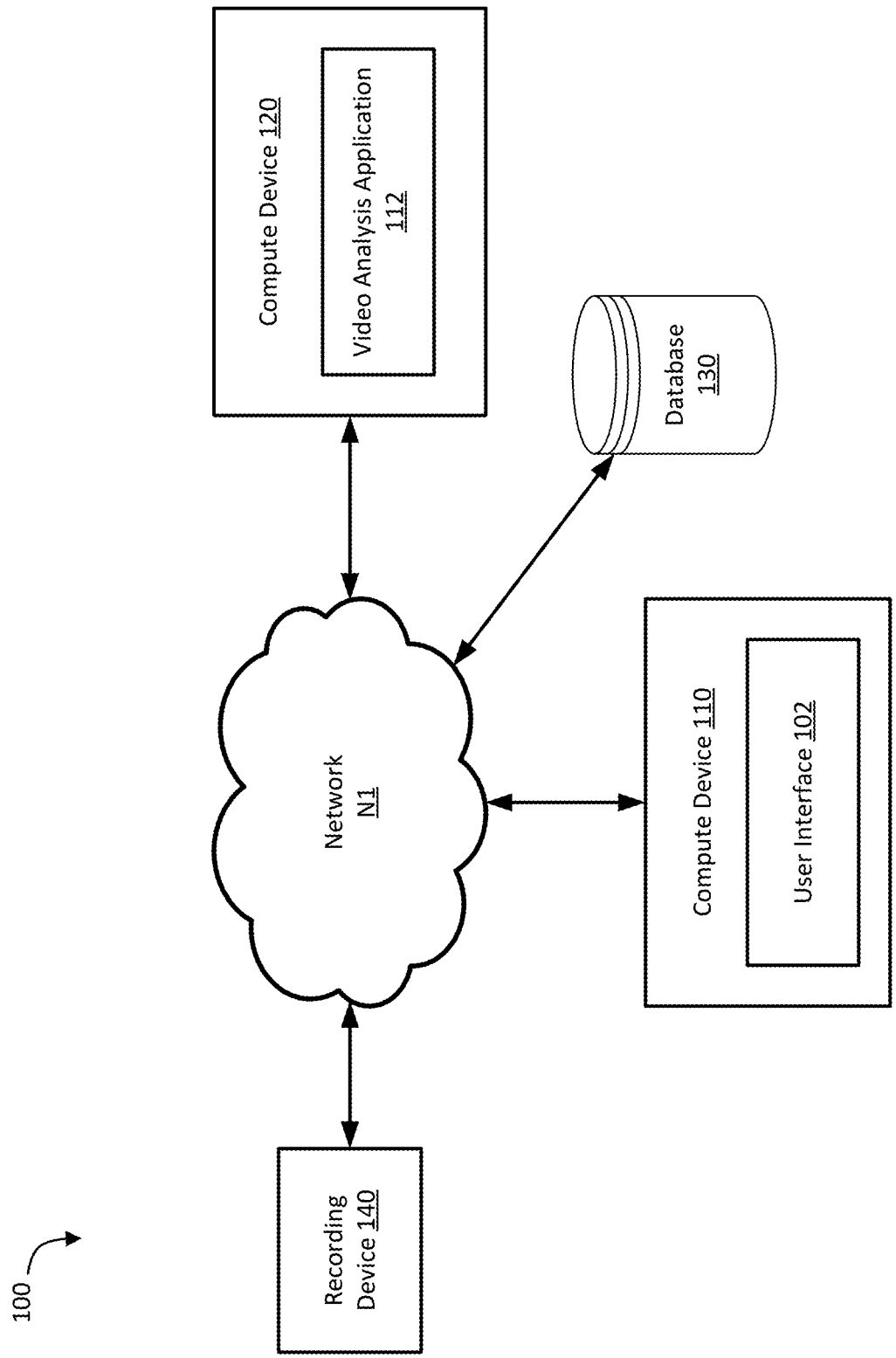
FIG. 1 is a block diagram of a video analysis system, according to an embodiment.

FIG. 1 shows a system block diagram of a video analysis system 100, according to an embodiment. The video analysis system 100 includes a compute device 110 (e.g., a user compute device), a compute device 120, a database 130, a recording device 140 (e.g., a body worn camera (BWC), an audio recording device, and/or the like), and a network N1. The video analysis system 100 can include alternative configurations, and various steps and/or functions of the processes described below can be shared among the various devices of the video analysis system 100 or can be assigned to specific devices (e.g., the compute device 110, the compute device 120, and/or the like). For example, in some configurations, a user can provide inputs directly to the compute device 120 rather than via the compute device 110, as described herein. In some instances, the video analysis system 100 can include a plurality of BWCs, where the plurality of BWCs can be associated with a plurality of patrol officers (and/or the like).

In some embodiments, the compute device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge node or other remote computing facility/device. In some implementations, each of the compute device 110 and/or compute device 120 can be a data center or other control facility configured to run and/or execute a distributed computing system and can communicate with other compute devices (not shown in FIG. 1).

The compute device 110 can implement a user interface 102. The user interface 102 can be a graphical user interface (GUI) configured to receive user-defined data and/or display video content selected by a video analysis application 112 (described further herein), transcription data generated by the video analysis application 112, user-selectable elements, officer identifiers, etc. The user interface 102 can be implemented via software (e.g., that is executed via a processor that is functionally and/or structurally similar to the processor 220 of FIG. 2, described herein) and/or hardware. The user interface 102 can be a graphical user interface (GUI) that is structurally and/or functionally similar to the user interface 340 of FIG. 3 and/or the review interface 400 of FIG. 4 (described herein).

The compute device 120 can implement a video analysis application 112. The video analysis application 112 can be functionally and/or structurally equivalent to the video analysis application 212 of FIG. 2 and/or the video analysis application 312 of FIG. 3 (described herein). The compute device 120 can be configured to receive input data from the user via the user interface 102 and/or cause display, via the user interface 102, of output data generated by the video analysis application 112. The input data can include, for example, user-defined confidence score thresholds, confirmation indications, rejection indications, invalidation requests, redaction requests, etc., as described further herein. The output data can include, for example, video data identified by the video analysis application 112, transcription data (e.g., a portion(s) of speaker separated transcription data), labels, redaction text, etc., as described further herein. The video analysis application 112 can be implemented via software (e.g., at a memory and processor of compute device 120) and/or hardware.

The database 130 can include at least one memory, repository and/or other form of data storage. The database 130 can be in communication with the compute device 110, the compute device 120, and/or the recording device 140 (e.g., via the network N1). In some implementations, the database 130 can be housed and/or included in one or more of the compute device 110, the compute device 120, or a separate compute device(s). The database 130 can be configured to store, for example, video data captured by a body worn camera, video segments, attribute indications (e.g., speaker specific attribute indications, such as below standard language indications; conversation attribute indications, such as threat indications, etc.), and/or machine learning models, as described herein.

The database 130 can include a computer storage, such as, for example, a hard drive, memory card, solid-state memory, ROM, RAM, DVD, CD-ROM, write-capable memory, and/ or read-only memory. In addition, the database 130 may include a distributed storage system where data is stored on a plurality of different storage devices, which may be physically located at a same or different geographic location (e.g., in a distributed computing system). In some implementations, the database 130 can be associated with cloud-based/remote storage.

The recording device 140 can include a video camera, still image camera, and/or a microphone that can be worn by a human and/or animal and/or can be fixed on a vehicle, building, structure, etc. In some instances, an entity (e.g., a police department) can own, operate, and/or manage the compute devices 110-120, the database 130, and the recording device 140.

Alternatively, a plurality of entities can be associated with, collectively, the compute devices 110-120, the database 130, and the recording device 140. For example, a first entity (e.g., a police department) can be associated with the recording device 140, a second entity (e.g., a police watchdog entity) can be associated with the compute device 110 and/or the database 130, and/or a third entity (e.g., a video analysis service provider) can be associated with the compute device 120.

The compute device 110, the compute device 120, the database 130, and/or the recording device 140 can be networked and/or communicatively coupled via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and/or from other compute devices, such as a modem(s) and/or a wireless interface(s).

In some implementations, although not shown in FIG. 1, the video analysis system 100 can include multiple compute devices 110 and/or compute devices 120. For example, in some implementations, the video analysis system 100 can include a plurality of compute devices 110, where each compute device 110 can be associated with a different user from a plurality of users. In some implementations, a plurality of compute devices 110 can be associated with a single user.

Figure 2:
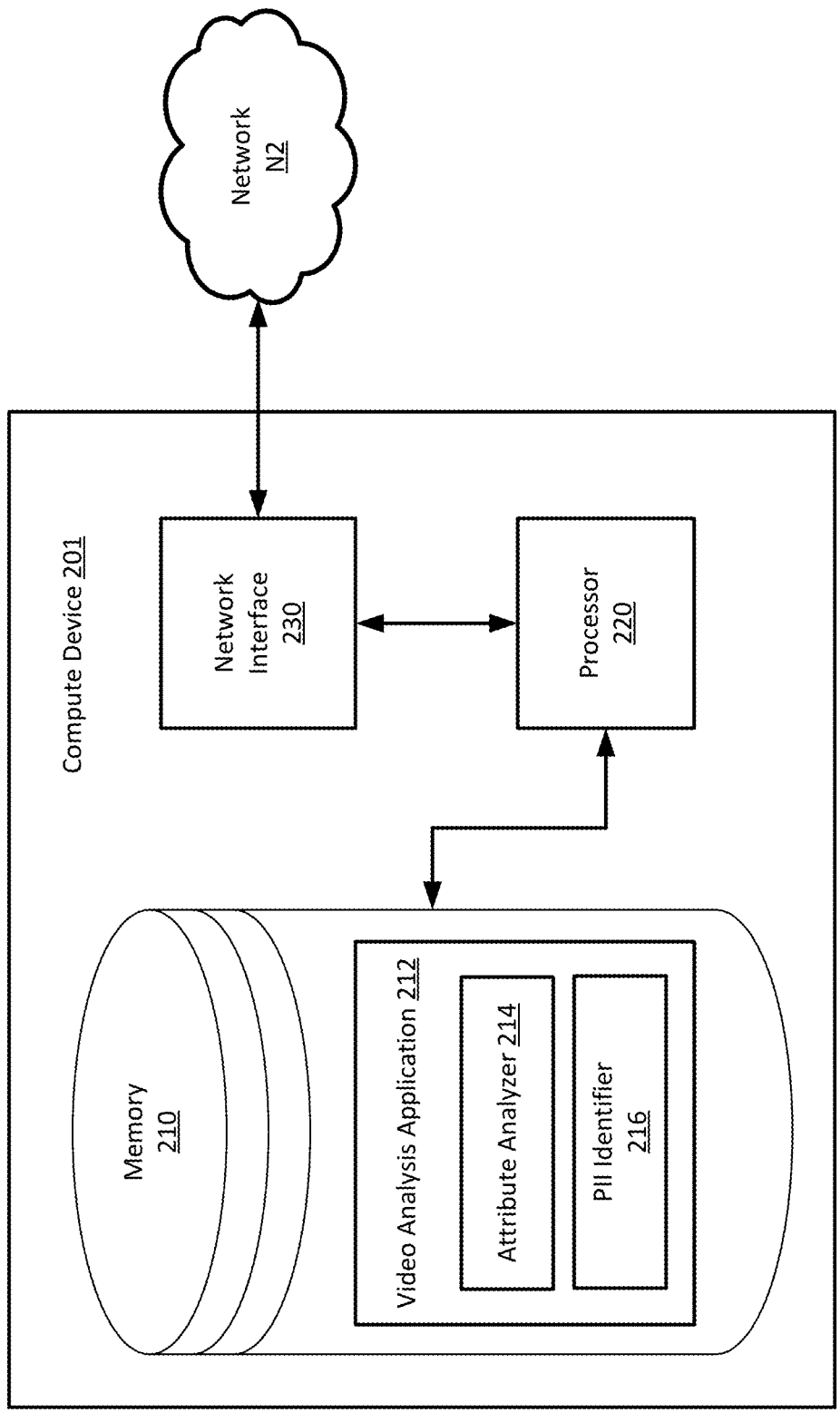
FIG. 2 is a block diagram of a compute device included in a video analysis system, according to an embodiment.

FIG. 2 shows a system block diagram of a compute device 201 included in a video analysis system, according to an embodiment. The compute device 201 can be structurally and/or functionally similar to, for example, the compute device 120 of the video analysis system 100 shown in FIG. 1. The compute device 201 can be a hardware-based computing device, a multimedia device, and/or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely located from and operatively coupled with the compute device 201, for example, via the network interface 230. For example, a remote database server can be operatively coupled to the compute device 201.

The memory 210 can store various instructions associated with processes, algorithms and/or data, including machine learning models, as described herein. Memory 210 can further include any non-transitory computer-readable storage medium for storing data and/or software that is executable by processor 220, and/or any other medium that may be used to store information that may be accessed by processor 220 to control operation of the compute device 201. For example, the memory 210 can store data associated with a video analysis application 212. The video analysis application 212 can be functionally and/or structurally similar to the video analysis application 112 of FIG. 1 and/or the video analysis application 312 of FIG. 3 (described herein).

Figure 3:
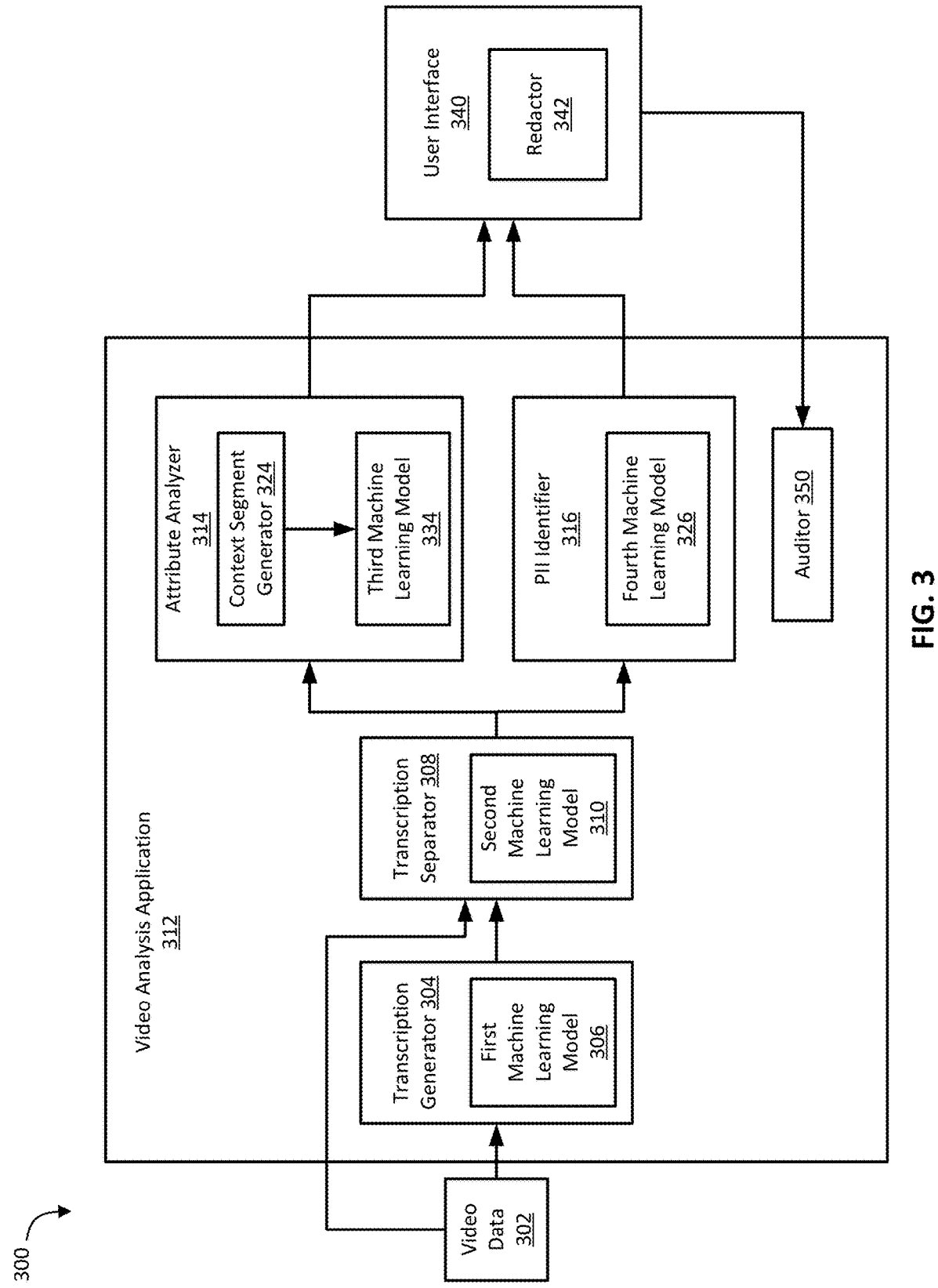
FIG. 3 is a block diagram of video analysis components included in a video analysis system, according to an embodiment.

The video analysis application 212 can include an attribute analyzer 214, which can be functionally and/or structurally similar to the attribute analyzer 314 of FIG. 3, described further herein. The video analysis application 212 can also include a personal identifiable information (PII) identifier 216, which can be functionally and/or structurally similar to the PII identifier 316 of FIG. 3, described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include an output device (e.g., a display, a speaker, a haptic device, etc.), an input device, and/or an output interface (not shown in FIG. 2). The display can be any display device by which the compute device 201 can output and/or display data (e.g., via a user interface that is structurally and/or functionally similar to the user interface 102 of FIG. 1, the user interface 340 of FIG. 3 (described herein), and/or the review interface 400 of FIG. 4 (described herein)). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals. Alternatively or in addition, the compute device 201 can cause display of data and/or receive data via another compute device (e.g., that is functionally and/or structurally similar to the compute device 110) that includes a display and/or input device.

FIG. 3 shows a system block diagram of video analysis components 300 included in a video analysis system (e.g., that is functionally and/or structurally similar to the video analysis system 100 of FIG. 1). The video analysis components 300 can be associated with a compute device (e.g., a compute device that is structurally and/or functionally similar to the compute device 201 of FIG. 2 and/or the compute devices 110 and/or 120 of FIG. 1). In some instances, for example, the video analysis components 300 can include software stored in memory 210 and configured to execute via the processor 220 of FIG. 2. In some instances, for example, at least a portion of the video analysis components 300 can be implemented in hardware. The video analysis components 300 include video data 302, a video analysis application 312 (e.g., that is functionally and/or structurally similar to the video analysis application 112 of FIG. 1 and/or the video analysis application 212 of FIG. 2), and a user interface 340 (e.g., that is structurally and/or functionally similar to the user interface 102 of FIG. 1 and/or the review interface 400 of FIG. 4 (described herein)). The video analysis application 312 includes a transcription generator 304, a transcription separator 308, an attribute analyzer 314 (e.g., that is structurally and/or functionally similar to the attribute analyzer 214 of FIG. 2), a PII identifier 316 (e.g., that is structurally and/or functionally similar to the PII identifier 216 of FIG. 2), and an auditor 350.

The video data 302 can include, for example, a plurality of video frames and/or audio data. The video data 302 can be captured via, for example, a camera, such as a body worn camera (e.g., that is functionally and/or structurally similar to the recording device 140 of FIG. 1), a smartphone camera, a surveillance camera, and/or the like. In some embodiments, although not shown in FIG. 3, the video analysis application 312 can receive audio data (e.g., that is recorded via a microphone) and not a plurality of video frames.

The transcription generator 304 included in the video analysis application 312 can receive the video data 302 as input to produce transcription data. More specifically, the video analysis application 312 can include a first machine learning model 306 that is configured to receive audio data included in the video data 302 as input and produce text data that represents a transcription of speech data that is included in the audio data. In some instances, the speech data can be associated with a plurality of speakers (e.g., human speakers, such as a patrol officer talking with a community member (e.g., a civilian, a suspect, a witness, etc.)). The transcription data can represent the speech data associated with the plurality of speakers without indicating which portion(s) of the speech data are associated with a specific speaker from the plurality of speakers. The first machine learning model 306 can include, for example, a speech-to-text model, a Whisper model, and/or a machine learning model that is similarly suited for automatic speech recognition (ASR).

The first machine learning model 306 can be trained based on labeled body worn camera data (e.g., video data and/or audio data). The body worn camera data can be labelled such that conversations between officers wearing the body worn camera and the individuals the officers are speaking with. The body worn camera data can include recordings of a plurality of accents to reduce bias in the transcription performed by the first machine learning model 306. In addition to increasing transcription accuracy, training the first machine learning model 306 using this body worn camera data can also increase privacy protection by preventing the first machine learning model 306 from transcribing conversations that are not associated with the officer but that are recorded by (e.g., within "earshot" of) the body worn camera.

The video data 302 and/or the transcription data produced by the transcription generator 304 can be provided as input to the transcription separator 308 to produce speaker separation data and/or speaker separated transcription data. More specifically, the transcription separator 308 can include a second machine learning model 310, which can be configured to produce the speaker separation data. The speaker separation data can include, for example, a plurality of time stamps associated with starts and/or ends of a plurality of uninterrupted utterances associated with the plurality of speakers. The transcription separator 308 can then segment the transcription data based on the plurality of timestamps to produce speaker separated transcription data. Alternatively or in addition, the transcription separator 308 can be configured to produce a list (and/or a similar data structure) of utterances represented in the transcription data, where each element of the list is associated with an utterance attributable to a speaker from a plurality of speakers (and not with one or more remaining speakers from the plurality of speakers). The portion of the speaker separated transcription data (e.g., a portion associated with an individual speaker) can include an element(s) of this list.

The transcription separator 308 can include, for example, a speaker diarization model that is configured to detect a speaker change within the audio data. In at least one embodiment, this process can be performed after transcription (e.g., as performed by the transcription generator 304), rather than during and/or before transcription, such that noises and/or other disruptions that can be common in body cam-collected audio data do not adversely affect (or significantly affect) a continuous single speaker transcription. In some instances, if diarization is performed before and/or during transcription, breaks attributable to noise and/or other disruptions can break continuity of the transcription, causing reduced transcription accuracy.

In some instances, a speaker(s) from the plurality of speakers that is captured in the audio data can have an unknown identity and/or an unknown role. Given a set of anonymous speakers, to determine whether a speaker is, for example, an officer or a community member who is conversing with the officer, the transcription separator 308 can be configured to determine whether a speaker is a person who was wearing the body worn camera while the body worn camera recorded the audio data and, therefore, infer that that speaker is the officer. To determine whether a speaker was wearing the body worn camera, the transcription separator 308 can be configured to measure the voice quality of each speaker using a metric(s) such as: a short time intelligibility measure (stoi), a time domain segmental signal to noise ratio (SNRseg), a frequency weighted segmental signal to noise ratio (fwSNRseg), and/or a normalized covariance metric (ncm).

The transcription separator 308 can be configured to assign a speaker whose audio segment(s) has the highest signal quality as an officer. In some instances, multiple speakers can have a similar and/or a relatively high signal quality if, for example, the officer is facing away from the microphone of the body worn camera and a civilian is talking towards the microphone. Accordingly, in some instances, the transcription separator 308 can include a text-based classifier (not shown in FIG. 3) that is trained to recognize officer-specific language patterns (e.g., in conjunction with an audio analyzer that determines a speaker that is closest to the recording device). In some implementations, the transcription separator 308 can further include aspects and/or details shown and described in U.S. Pat. No. 12,014,750, filed Mar. 8, 2023, and titled "AUDIO ANALYSIS OF BODY WORN CAMERA," which is incorporated herein by reference.

The transcription separator 308 can provide a first portion of the speaker separated transcription data (e.g., a portion that is associated with an officer, as determined by the transcription separator 308) as input to the attribute analyzer 314, which can be configured to produce an attribute indication (e.g., a speaker specific attribute indication and/or a conversation attribute indication). An attribute indication can include, for example, an embedding (e.g., embedded data), a vector, a classification, and/or the like.

More specifically, the attribute analyzer 314 can include a context segment generator 324 and a third machine learning model 334. The context segment generator 324 can extract a segment (e.g., a phrase, a sentence, 10 words, 15 words, etc.) from the first portion of the speaker separated transcription data to produce a plurality of segments. Each segment from the plurality of segments can be iteratively provided as input to a context window of the third machine learning model 334 to produce an attribute indication for that segment. For example, a first segment from the plurality of segments can be provided as input to the context window and, after the third machine learning model 334 has produced an attribute indication for the first segment, the context window can be cleared of the first segment. A second segment (e.g., a second sentence and/or phrase that follows a first sentence and/or phrase included in the first portion of the speaker separated transcription data) can then be provided to the context window to produce an attribute indication for that second segment.

The first segment can include text that does or does not overlap with the second segment. For example, the second segment can be determined based on a rolling window, such that after the third machine learning model 334 has processed the first segment (e.g., a set of words, tokens, characters, etc.), a predetermined number of tokens (e.g., one token, two tokens, etc.) from the beginning of the first segment can be removed from the context window, and a predetermined number of tokens from the speaker separated transcription data (e.g., tokens proceeding the first segment) can be included in the context window to define the second segment.

By including a model(s) (e.g., the third machine learning model 334) with a context window-based architecture, the attribute analyzer 314 can analyze a word in context rather than as a keyword in isolation. The attribute analyzer 314 can infer the context based on surrounding words, phrases, sentences, paragraphs, etc., that are included in the context window. As a result, the attribute analyzer 314 can prevent, for example, otherwise profane language included in the speaker separated transcription data from being flagged if the attribute analyzer 314 determines that an officer uttered the profane language in the context of quoting someone else.

The third machine learning model 334 can include, for example, a text classifier, a transformer, a large language model (LLM), and/or the like. Although not shown in FIG. 3, in some instances, the video data 302 (e.g., the plurality of video frames and/or the audio data) can be provided as input to the attribute analyzer 314 to determine the attribute indication based on, for example, speech tone, speech volume, speech cadence, gestures (e.g., officer hand motion captured in the video data 302), and/or the like. In some implementations, the third machine learning model 334 can determine a confidence score associated with an attribute(s) for a segment and can generate the attribute indication(s) based on the confidence score being above a predetermined threshold value. In some instances, the user can define the threshold value (e.g., via the user interface 340, described herein).

In some implementations, the attribute analyzer 314 can produce a speaker specific attribute indication in response to detecting that the first portion of the speaker separated transcription data includes, for example, below standard language (e.g., profanity, slurs, curse words, etc., uttered by the officer towards a community member). More specifically, the third machine learning model 334 can include a first large language model (LLM) that is configured to receive a first portion of the speaker separated transcription data, where the first portion is associated with (1) a first speaker from a plurality of speakers (e.g., a police officer) and (2) not a remaining speaker(s) (e.g., a community member(s)) from the plurality of speakers. For example, the first portion of the speaker separated transcription data can indicate utterances of the police officer and not the community member. The first LLM can be configured to produce the speaker specific attribute indication (e.g., that indicates that the first speaker uttered, for example, below standard language) based on the first portion of the speaker separated transcription data.

The attribute analyzer 314 can be further configured to produce a conversation attribute indication in response to detecting that a conversation (as recorded in the video data 302) between the first speaker (e.g., the police officer) and a second speaker (e.g., a community member) from the plurality of speakers (1) includes a threat (e.g., a threat of force) made by the first speaker towards the second speaker and/or (2) indicates that harm (e.g., a use of force) was previously inflicted on the second speaker by the first speaker. More specifically, the third machine learning model 334 can include a second LLM (e.g., that is different from and/or orthogonal to the first LLM) that can receive (1) the first portion (e.g., associated the police officer) and a second portion (e.g., associated with the community member) of the speaker separated transcription data as input to produce the conversation attribute indication.

In some instances, the attribute indication can include a feature vector and/or another indication(s) to indicate a plurality of speaker specific attribute subtypes (e.g., below standard language subtypes, such as a racial slur, a sexual slur, etc.) and/or a plurality of conversation attribute subtypes (e.g., threat subtypes, such as a threat of physical harm, a threat of property harm, a threat of legal harm, etc.). An attribute indication can also indicate an inferred intent and/or mental state of an officer who uttered the words associated with the attribute indication. For example, an attribute indication can classify a portion of the speaker separated transcription data as being associated with 'aggression,' 'anxiety,' 'apology,' 'arrest', 'bias,' 'bragging,' 'collusion,' 'de-escalation,' 'fear,' 'general,' 'gratitude,' 'manipulation,' 'mistrust,' 'reassurance,' 'secrecy,' etc.

In some implementations, below standard language (e.g., profanity, slurs, etc.) can be defined and/or determined based on feedback received from a user's assignment of a below standard language label (e.g., via the user interface 340, described herein) to a segment of a portion of the speaker specific transcription data. Alternatively or in addition, in some implementations, below standard language can be user-defined (e.g., can be police department-specific and/or the like) to account for specific regional and/or cultural tolerance towards profanity, slurs, etc. In some implementations, below standard language can be initially defined based on a predefined word list, and the video analysis application 312 can be configured to identify or ignore a word from the word list that appears in the speaker separated transcription data (e.g., based on supervised and/or reinforcement learning and/or additional context provided by the speaker separated transcription data).

The transcription separator 308 can also provide a second portion of the speaker separated transcription data (e.g., a portion that is different from the first portion of the speaker separated transcription data and/or a portion that is associated with a community member, as determined by the transcription separator 308) as input to the PII identifier 316 to identify PII text in the second portion of the speaker separated transcription data. Alternatively or in addition, the first portion of the speaker separated transcription data (e.g., that is associated with the officer) can be provided as input to the PII identifier 316 to identify PII text. For example, the PII text can reflect sensitive information (e.g., a name(s), license plate number, address, and/or other alphanumeric sensitive data) that is uttered by the community member and/or the officer and recorded within the audio data of the video data 302.

Although not shown in FIG. 3, the transcription separator 308 can include a context segment generator (e.g., that is structurally and/or functionally similar to the context segment generator 324) and/or can use the context segment generator 324 described above, to generate segments of the second portion of the speaker separated transcription data. A segment can be provided to a context window of a fourth machine learning model 326 included in the PII identifier 316 and, based on segment within the context window, the fourth machine learning model 326 can identify PII text within that segment. The fourth machine learning model 326 can include, for example, a text classifier, a transformer model, a large language model (LLM), and/or the like. In some implementations, the fourth machine learning model 326 can be trained for higher recall or similarly stated, can over-redact (e.g., identify false-positives while searching for PII) to promote stricter privacy.

In some implementations, the fourth machine learning model 326 can generate an embedding (e.g., vector) to indicate the PII text. The fourth machine learning model 326 can be different from the third machine learning model 334 of the attribute analyzer 314, such that the vector generated by the fourth machine learning model 326 can be orthogonal to the vector generated by the third machine learning model 334. As a result, the video analysis application 312 can be configured to identify likelihoods that a given segment includes both below standard language and PII. For example, a segment associated with an officer's utterance can include a threat that names the community member to whom the threat is directed (e.g., "I will tase you, John!"). The third machine learning model 334 and the fourth machine learning model 326 can produce embeddings that indicate, respectively, high likelihoods that the segment includes a threat and PII (e.g., the name "John Smith").

The PII identifier 316 can be further configured to automatically (e.g., without human intervention) replace the identified PII text within the speaker separated transcription data with redaction text. For example, the PII text "John Smith" can be replaced the redaction text "***" or "[redacted]." The PII identifier 316 can replace the PII text with the redaction text before the speaker separated transcription data is displayed to a user via the user interface 340 (described further below). In some instances, the user interface 340 can be configured to permit a user to select additional text to redact (e.g., text that was not automatically recognized as PII text by the PII identifier 316). However, the user interface 340 can prevent a user from reverting the redaction text, such that the user is unable to view the PII text identified by the PII identifier 316.

The user interface 340 can include a GUI that can be executed via a processor of a user compute device (e.g., that is functionally and/or structurally similar to the compute device 110 of FIG. 1). The GUI can depict to a user the video data 302 (and/or facilitate playing of audio data included in the video data 302 via a sound output device that is operably coupled to the user compute device), the transcription data produced by the transcription generator 304, and/or the speaker separated transcription data produced by the transcription separator 308. In some implementations, the user interface 340 can display a portion of the video data 302 and/or a portion of the transcription data, that is associated with an attribute indication (e.g., below standard language, a threat, etc.). For example, as described further herein, the video analysis application 312 can add a portion of the video data 302 to a selectable (e.g., a user selectable) queue from a plurality of selectable queues, where the queue is associated with an attribute (e.g., racial slur) from a plurality of attributes (e.g., profanity, verbal threat, etc.). A user can select the selectable queue (e.g., by clicking and/or tapping a selectable icon), and in response, the user interface 340 can display the portion of the video data 302 (and not, for example, remaining portions of the video data 302 that are not associated with the attribute that is associated with the selectable queue).

The user interface 340 can be further configured to display speaker separated transcription data (e.g., in the form of segments) and/or a speaker identifier (e.g., an officer identifier, such as an officer name and/or badge number) associated with the speaker separated transcription data. The user interface 340 can be further configured to display a label(s) (e.g., a below standard language label, a verbal threat label, a profanity label, a directed (e.g., towards a community member) label, a racial slur label, etc.) based on the attribute indication(s) that is determined for a given segment. The user interface 340 can display the label (e.g., tag) such that the label is associated with and/or highlights the displayed segment associated with the label. The user interface 340 can further display a plurality of selectable elements that can permit the user to confirm or reject (e.g., invalidate) a label. For example, in response to the user selecting a confirmation element, the user interface 340 can produce a confirmation indication. The confirmation indication can cause the label associated with the attribute to persist and/or designate the portion of the video data 302 (and/or a larger portion of the video data 302, such as video content depicting the lead up to the event associated with the label) to be stored for further use (e.g., for discipline and/or training purposes).

In response to the confirmation indication, the user interface 340 can be further configured to generate a feedback signal (and/or cause the video analysis application 312 to generate a training signal) to retrain the third machine learning model 334 (e.g., to modify a weight(s) of the third machine learning model 334) and/or reinforce a selected weight(s) of the third machine learning model 334. Alternatively or in addition, a user can select a rejection element (e.g., an invalidation element) displayed via the user interface 340 if the user disagrees with the label indicating an attribute determined by the attribute analyzer 314. In response, the user interface 340 can generate a removal request (e.g., an invalidation request) to cause the label to be deleted, prevented from being displayed via the user interface 340, and/or disassociated from the segment and/or the portion of the video data 302. In some instances, in response to the removal request, the portion of the video data 302 and/or the segment of the speaker separated transcription data can be removed from a memory associated with the video analysis application 312 (e.g., a memory that is functionally and/or structurally similar to the memory 210 of FIG. 2 and/or the database 130 of FIG. 1). Alternatively or in addition, in some instances, in response to the removal request, the user interface 340 can be further configured to generate a feedback signal (and/or cause the video analysis application 312 to generate a training signal) to retrain the third machine learning model 334 (e.g., to prevent the third machine learning model 334 from generating false positive attribute indications and/or reduce the occurrences of false positives). In some instances, as described further herein, the user interface 340 can display an additional user-selectable element that can permit the user to reject the label without causing a feedback signal to be sent to cause retraining of the third machine learning model 334.

The video analysis application 312 can further include an auditor 350, which can be configured to record instances where a user selects a rejection (e.g., invalidation) element to cause a label (e.g., that is associated with a below standard language and/or threat) to be removed and/or disassociated from a portion of the video data 302. For example, the auditor 350 can produce audit data in response the removal (e.g., invalidation) request, and the audit data can indicate, for example, the user's identity, the depicted officer's identity, the removed label (e.g., the attribute indication associated with the removed label), the portion of the video data 302 associated with the removed label, the segment of the speaker separated transcription data associated with the removed label, and/or the like.

Figure 4:
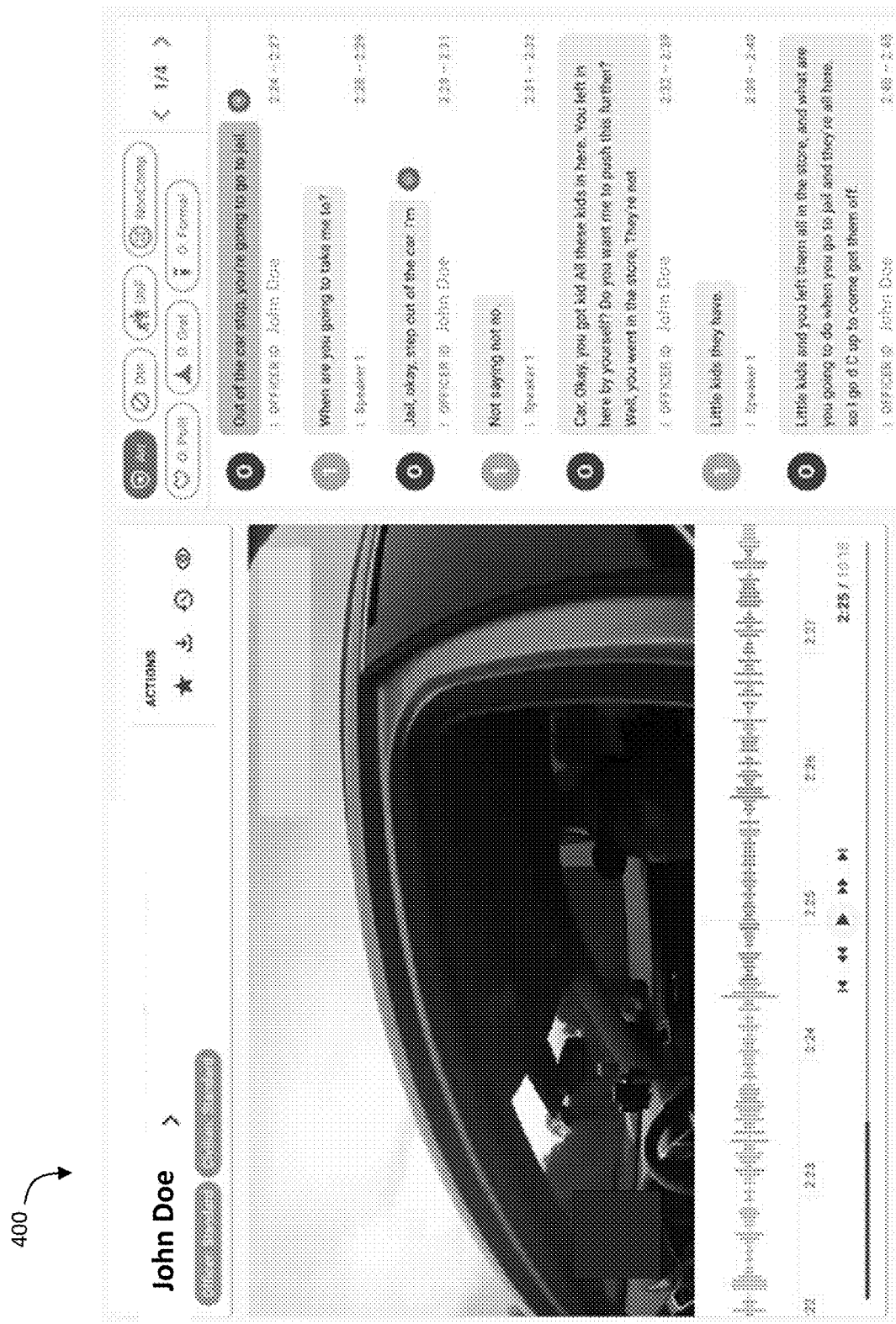
FIG. 4 shows a video depicted within a review interface, according to an embodiment.

FIG. 4 shows a video depicted within a review interface 400, according to an embodiment. In at least one embodiment, supervisors are interested in reviewing BWC videos, such as, for example the example video frame shown in FIG. 4, to analyze at-risk officer behavior, such as officer directed profanity or foul language, or events such as a use of force. In an implementation of a review interface 400 (e.g., a rapid risk verification interface) depicted in FIG. 4 (e.g., which can be functionally and/or structurally similar to the user interface 102 of FIG. 1 and/or the user interface 340 of FIG. 3), an inbox of risk provides risk labels that have not been verified. The supervisor is presented with a segment the supervisor can evaluate and then respond and/or label, for example, with "yes", "no", "not officer", "skip", etc. (e.g., via user selectable elements).

Figure 5:
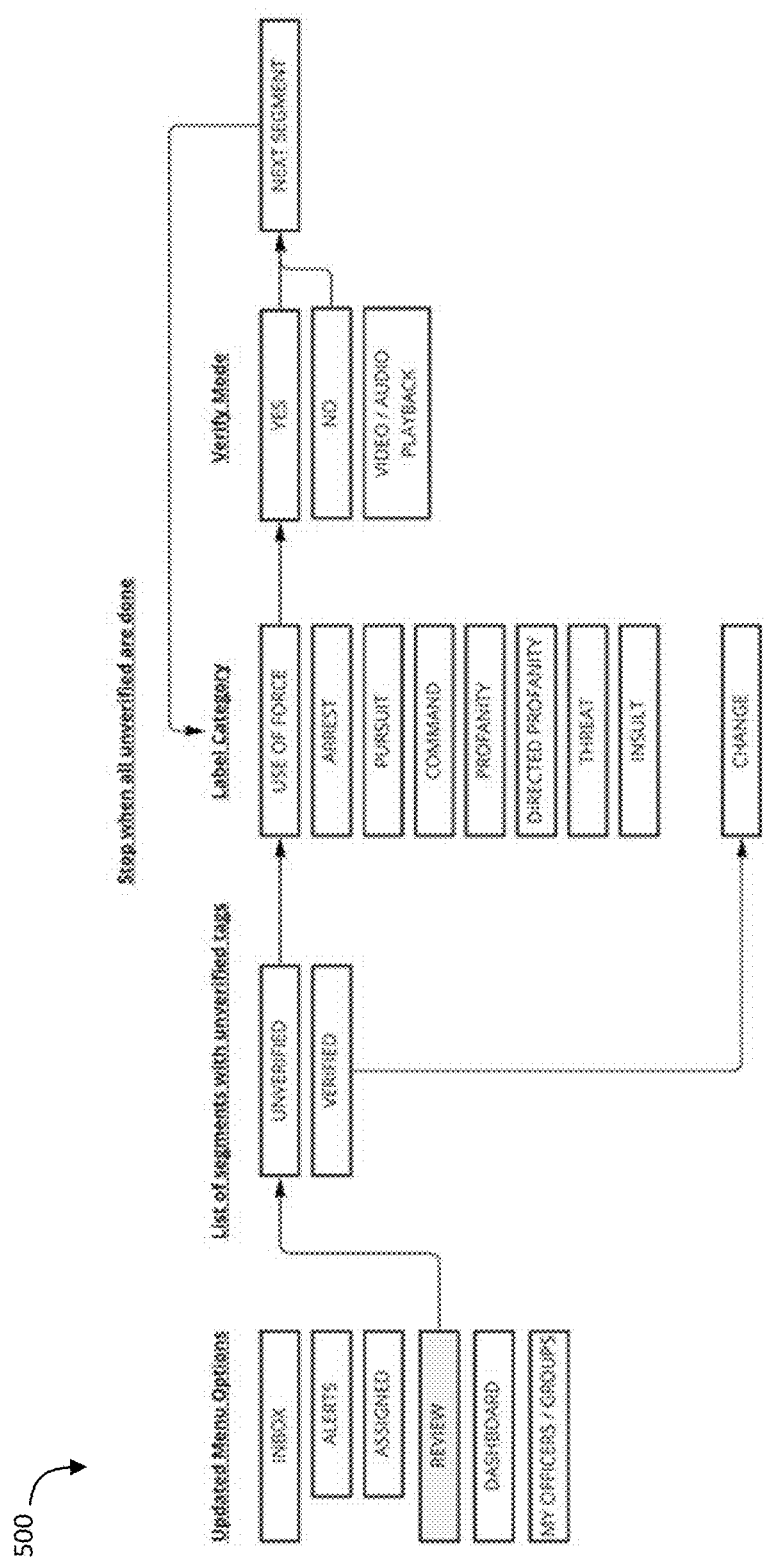
FIG. 5 shows a menu implemented by a review interface, according to an embodiment.

FIG. 5 shows a menu 500 implemented by a review interface (e.g., that is functionally and/or structurally similar to the user interface 102 of FIG. 1, the user interface 340 of FIG. 3, and/or the review interface 400 of FIG. 4), according to an embodiment. The menu 500 can include a plurality of label categories that a user can assign to video segments having an unverified tag. The plurality of label categories can include, for example, use of force, arrest, pursuit, command, profanity, directed profanity, threat, and/or insult. The user can also change a machine-generated label via the menu 500.

Figure 6:
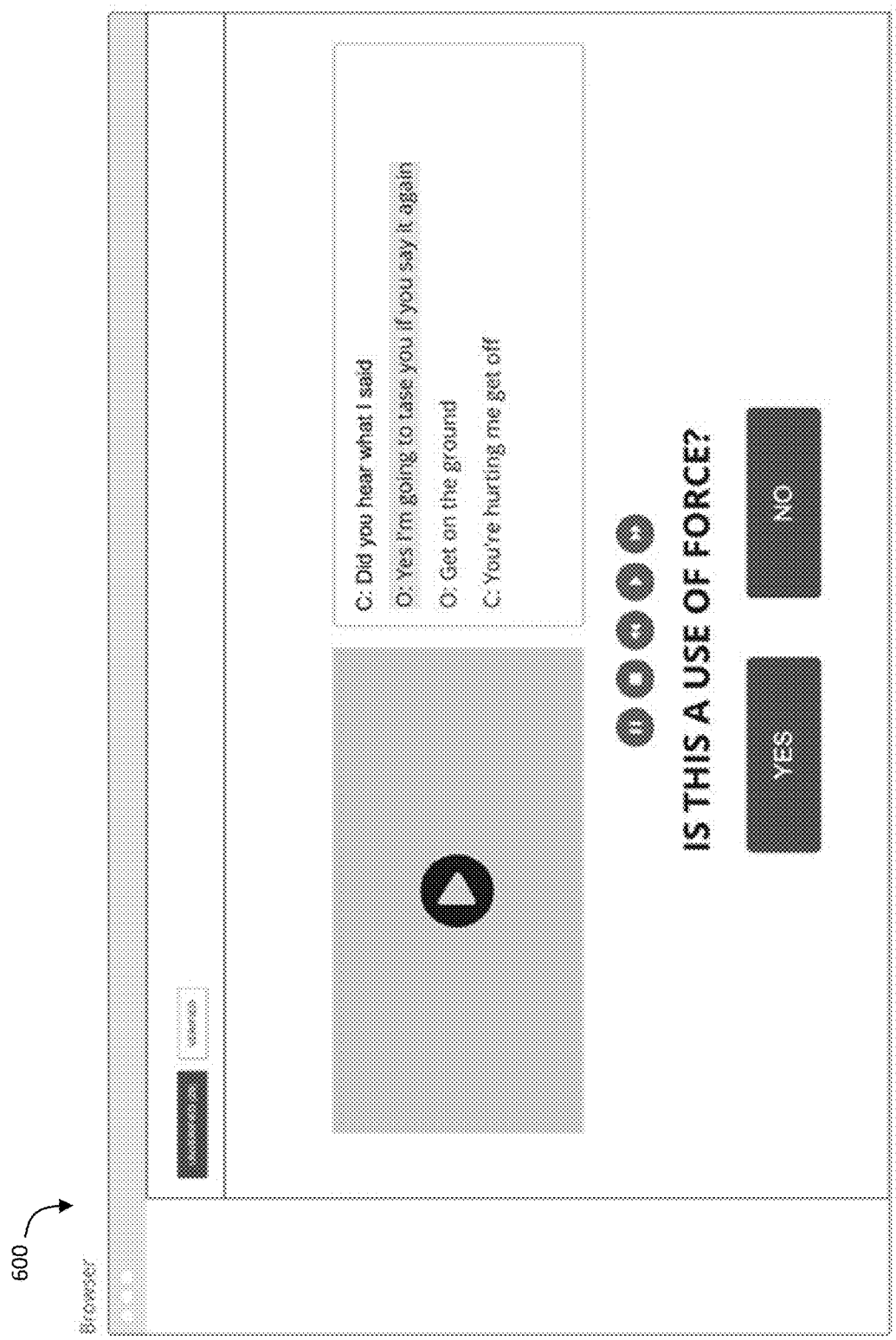
FIG. 6 shows a browser interface included in a review interface, according to an embodiment.

FIG. 6 shows a browser interface 600 included in a review interface (e.g., that is functionally and/or structurally similar to the user interface 102 of FIG. 1, the user interface 340 of FIG. 3, and/or the review interface 400 of FIG. 4), according to an embodiment. The browser interface 600 can prompt a user to indicate whether a video and/or transcript, displayed to the user via the browser interface 600, suggests that an officer used force and/or threatened use of force.

Figure 7:
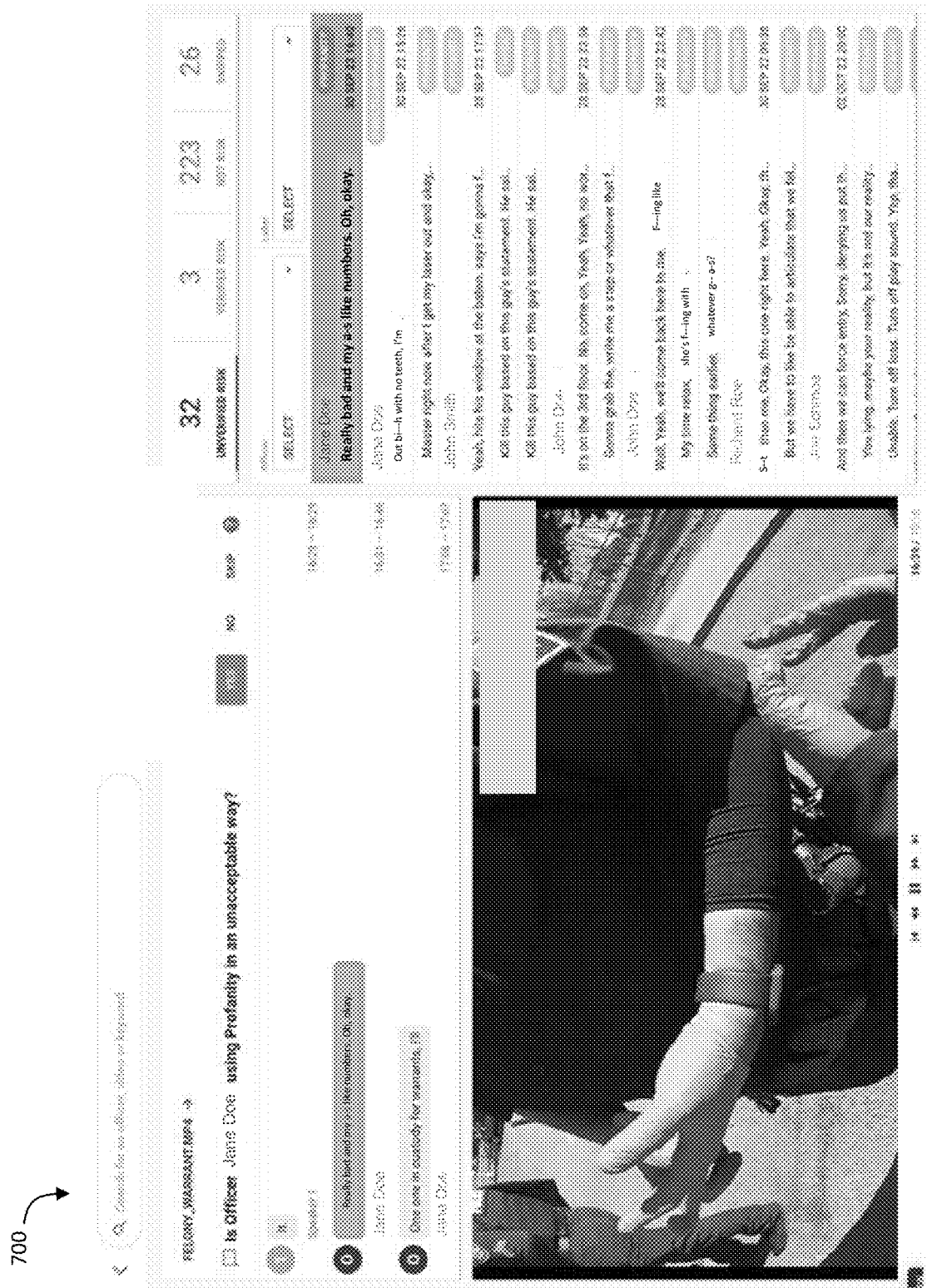
FIG. 7 shows a browser interface included in a review interface, according to an embodiment.

FIG. 7 shows a browser interface 700 included in a review interface (e.g., that is functionally and/or structurally similar to the user interface 102 of FIG. 1, the user interface 340 of FIG. 3, and/or the review interface 400 of FIG. 4), according to an embodiment. The browser interface 700 can depict a video and speaker separated transcription data that is associated with the video. The browser interface 700 can also depict attribute labels (e.g., a profanity label, a directed profanity label, a threat label, etc.) and/or speaker identifiers, where the attribute labels and the speaker identifiers are associated with segments of the speaker separated transcription data. While the interface shown in FIG. 7 displays profane language that is partially redacted (e.g., by replacing a character with "-"), in some implementations not shown in FIG. 7, the interface can display profane language (e.g., the speaker separated transcription data) without redaction and/or as generated by a transcription separator that is functionally and/or structurally similar to the transcription separator 308 of FIG. 3.

A response of "yes" can indicate the following assertion(s): (1) that the machine correctly identified risk and/or (2) that the risk was unjustified. A response of "no" can signify that the video analysis system (e.g., that is functionally and/or structurally similar to the video analysis system 100 of FIG. 1) did not correctly identify risk or that the risk was justified. A response of "not officer" can signify that the machine did not correctly identify the officer, and therefore there is no (or reduced) officer-risk. A response of "skip" can cause the video analysis system to retain the video in a queue for later review. Because the segments can be ordered and grouped by video, the interface can automatically (e.g., without human intervention) advance to the next segment within the video. In at least one example embodiment, the application (app) can force a user to review (e.g., not skip) segments that have been in the queue too long to facilitate improved risk response.

In at least one instance, a mobile version of the interface can be provided. The mobile version of the interface can allow, for example, directional swiping to review and respond to videos. Thus, as an example, the mobile app can interpret a left swipe to indicate "no", a right swipe to indicate "yes", an up swipe to indicate "not officer", and/or a down swipe to indicate "skip".

Figure 8:
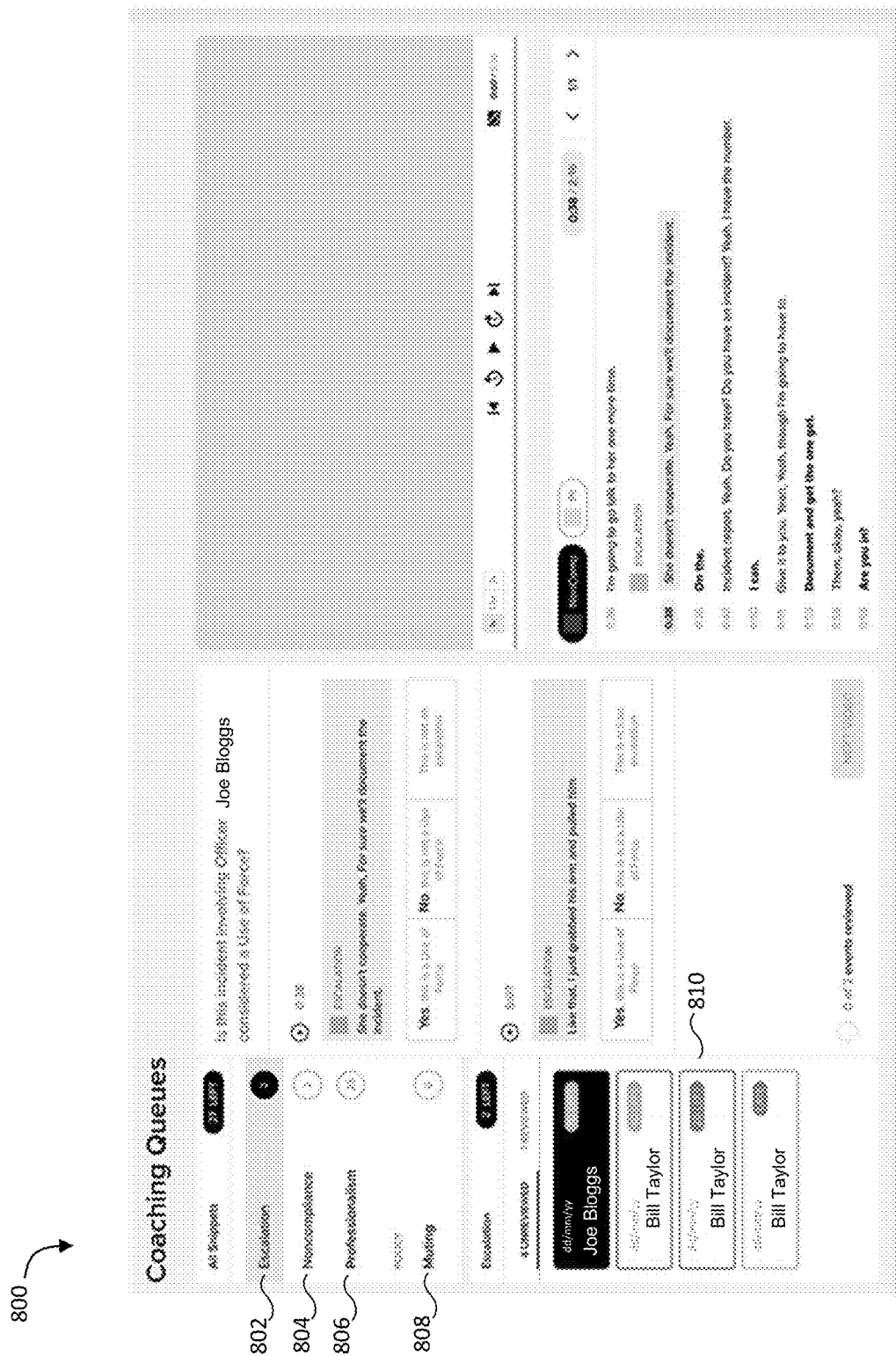
FIG. 8 shows a coaching queue interface included in a review interface, according to an embodiment.

Coaching queues can be an additional example extension of the rapid risk verification interface. In at least one aspect, coaching queues can expand the interface to additional relevant categories of interactions that a supervisor at a department may review. An example coaching queue interface 800 is shown in FIG. 8. The coaching queue interface 800 can be included in a user interface that is functionally and/or structurally similar to the user interface 102 of FIG. 1, the user interface 340 of FIG. 3, and/or the review interface 400 of FIG. 4.

A "queue" can be a collection of video snippets (e.g., portions of video data) that computer automated analysis has flagged for further review. The snippets can be thematically related. FIG. 8 shows three example "global" queues: escalation 802, noncompliance 804, and professionalism 806.

Escalation 802 can include snippets that could be possible uses of force. Noncompliance 804 can include snippets where an officer is interacting with a noncompliant civilian. Professionalism 806 can include snippets where unprofessional language was detected. While three queues are shown in FIG. 8 in this example, the global queues can cover other possible labels, including labels that a video analysis system (e.g., that is functionally and/or structurally similar to the video analysis system 100 of FIG. 1) detects and/or labels defined by a user. Additional labels can include, for example: frisk, detention, wellness issue, etc.

In FIG. 8, a policy queue 808 is shown below the global queues 802-806. The policy queue 808 can be included and/or can be turned on and/or off based on a user preference and/or a police department's internal policies. For example, a department may have a policy that permits officers to mute their cameras under certain conditions. The example muting policy queue 808 can be set to detect mute events for further review against policy.

The interface portion 810 below the list of queues 802-808 can display to the user a feed of videos to review within the category. As shown in FIG. 8, each video can include several snippets and can be marked with a status of how long the user has to review. Videos that are not reviewed in a timely manner (e.g., within 2 days) can be marked with progressively increasing delayed statuses, which can trigger alerts and/or reminders to a user and/or to a supervisor to indicate that a video has not yet been reviewed.

The second column shown in FIG. 8 depicts the rapid verification interface, where each snippet of the video to review can be presented to the user in a card format. While only two cards are shown on the screen in FIG. 8, one card and/or more than two cards can be shown/provided, such as, for example, in a scrolling format. The user can be provided a prompt question specific to the queue and a set of three choices in response.

The question can be worded such that a "yes" response (first of three choices) can validate that the label detected by the computer model is correct and the video needs further action. The action may be that the video is assigned to the officer in question to review and requires the officer in question to view the video, that training materials or policy materials are provided to the officer in question, and/or any other workflow by which a supervisor or other relevant user is to take action based on the verification of a notable event.

The "no" response (e.g., the second of three choices) can invalidate and/or remove the label, as described further herein at least in relation to FIG. 3. The third choice of response can be used to correct unwanted behavior in the computer model by marking a segment as a false positive and enabling the model (e.g., the third machine learning model 334 of FIG. 3) to train from the false positive. This could be a label that asserts, for example, that the machine-generated label (e.g., a label generated by a machine learning model that is functionally and/or structurally similar to the third machine learning model 334 of FIG. 3) was incorrect, that the machine-generated label was correct but attributed to the wrong speaker, that the machine-generated label was correct but a transcription error occurred, etc. This third choice can differ from the second, "no" response in that the "no" response can be a neutral response to the machine (e.g., the "no" response can indicate that the machine label was not necessarily wrong, but that under further review, a "yes" assertion is not appropriate). In this way, the third choice can permit a user to specifically direct the machine to learn from the false positive.

The video and transcript of the third column of the coaching queue interface 800 of FIG. 8 can provide the user with context for verification. The video and/or transcript can automatically advance to the current snippet card selected in the rapid verification column.

FIG. 9 shows a flowchart illustrating a method 900 that is implemented by a video analysis system to generate an attribute indication, according to an embodiment. The method 900 can be implemented by a video analysis system described herein (e.g., the video analysis system 100 of FIG. 1). Portions of the method 900 can be implemented using a processor (e.g., the processor 220 of FIG. 2) of any suitable compute device (e.g., the compute device 201 of FIG. 2 and/or the compute devices 110 and/or 120 of FIG. 1).

The method 900 at 902 incudes receiving video data that includes audio data and providing the audio data as input to a first machine learning model to produce transcription data. The audio data is provided as input at 904 to a second machine learning model to produce speaker separation data, and at 906, the transcription data is segmented based on the speaker separation data to produce speaker separated transcription data. The method 900 at 908 incudes providing a portion of the speaker separated transcription data from a plurality of portions of the speaker separated transcription data as input to a context window of a third machine learning model to produce an attribute indication. The portion can be associated with a speaker from a plurality of speakers and not with remaining speakers from the plurality of speakers. At 910, video data is caused to be displayed at a user compute device, the video data being associated with the portion of the speaker separated transcription data and not the remaining portions of the speaker separated transcription data.

FIG. 10 shows a flowchart illustrating a method 1000 that is implemented by a video analysis system to replace PII text with redaction text, according to an embodiment. The method 1000 can be implemented by a video analysis system described herein (e.g., the video analysis system 100 of FIG. 1). Portions of the method 1000 can be implemented using a processor (e.g., the processor 220 of FIG. 2) of any suitable compute device (e.g., the compute device 201 of FIG. 2 and/or the compute devices 110 and/or 120 of FIG. 1).

The method 1000 at 1002 includes receiving, via a processor, audio data, and providing, via the processor, the audio data as input to a first machine learning model to produce transcription data. At 1004, the audio data is provided via the processor as input to a second machine learning model to produce speaker separation data, and the transcription data is segmented at 1006, via the processor and based on the speaker separation data, to produce speaker separated transcription data. The method 1000 at 1008 includes providing, via the processor, a portion of the speaker separated transcription data as input to a third machine learning model to identify personal identifiable information (PII) text in the portion of the speaker separated transcription data. The portion is associated with a speaker from a plurality of speakers. At 1010, the method 1000 includes replacing, via the processor, the PII text with redaction text in the portion of the speaker separated transcription data, and at 1012, the method 1000 includes causing, via the processor, display of the transcription data including the redaction text at a user compute device.

Aspects of the systems and methods described herein can further include details shown and described in U.S. Pat. No. 12,014,750, filed Mar. 8, 2023, and titled "AUDIO ANALYSIS OF BODY WORN CAMERA."

According to an embodiment, an apparatus includes a processor and a memory that is operably coupled to the processor. The memory stores instructions to cause the processor to receive video data that includes audio data and provide the audio data as input to a first machine learning model to produce transcription data. The audio data is provided as input to a second machine learning model to produce speaker separation data, and the transcription data is segmented based on the speaker separation data to produce speaker separated transcription data. The instructions also cause the processor to provide a portion of the speaker separated transcription data from a plurality of portions of the speaker separated transcription data as input to a context window of a third machine learning model to produce an attribute indication, the portion (1) being associated with a speaker from a plurality of speakers and (2) not being associated with remaining speakers from the plurality of speakers. In response to producing the attribute indication, video data can be displayed at a user compute device, the video data being associated with the portion of the speaker separated transcription data and not the remaining portions of the speaker separated transcription data.

In some implementations, the portion of the speaker separated transcription data can be a first portion of the speaker separated transcription data, the speaker can be a first speaker, and the memory can further store instructions to cause the processor to provide at least one of the first portion of the speaker separated transcription data or a second portion of the speaker separated transcription data as input to a fourth machine learning model to identify personal identifiable information (PII) text in the at least one of the first portion of the speaker separated transcription data or the second portion of the speaker separated transcription data, the second portion being associated with a second speaker from the plurality of speakers. In response to identifying the PII text, the PII text can be replaced with redaction text in the second portion of the speaker separated transcription data, and the instructions can cause the processor to cause display of the transcription data including the redaction text at the user compute device.

In some implementations, the first speaker can be a peace officer, and the second speaker can be a civilian. In some implementations, the apparatus can further include an interface configured to communicate with a body camera, the video data being received from the body camera. In some implementations, the apparatus can include a body camera that can generate the video data. In some implementations, a system can include the apparatus, and the system can further include a body camera that can generate the video data. In some implementations, the portion of the speaker separated transcription data can be a first portion of the speaker separated transcription data, the attribute indication can be a first attribute indication, and the speaker can be a first speaker. The third machine learning model can include (1) a first large language model (LLM) configured to receive the first portion of the speaker separated transcription data as input to produce a speaker specific attribute indication and (2) a second LLM configured to receive the first portion of the speaker separated transcription data and a second portion of the speaker separated transcription data as input to produce a conversation attribute, the second portion of the speaker separated transcription data being associated with a second speaker from the plurality of speakers.

In some implementations, the memory can further store instructions to cause the processor to (1) receive a confirmation indication from the user compute device in response to the processor causing display of the video data and (2) generate a label for the video data, the label being associated with the attribute indication. In some implementations, the memory can further store instructions to cause the processor to cause a training signal to be sent to retrain the third machine learning model based on the confirmation indication. In some implementations, the memory can further store instructions to cause the processor to receive a rejection indication from the user compute device in response to the processor causing display of the video data. The instructions can also cause the processor to cause a training signal to be sent to retrain the third machine learning model based on the rejection indication. In some implementations, the memory can further store instructions to cause the processor to cause display of the portion of the speaker separated transcription data at the user compute device. In response to producing the attribute indication, the instructions can also cause display of a tag that (1) is associated with the attribute indication and (2) highlights the portion of the speaker separated transcription data at the user compute device, cause display of an identifier associated with the speaker, and further cause display of a selectable element associated with at least one of a confirmation indication or a rejection indication. In some implementations, the instructions to cause the processor to cause display of the video data at the user compute device can include instructions to cause the processor to add the video data to a selectable queue that is associated with the attribute indication.

According to an embodiment, a method includes receiving, via a processor, audio data, and providing, via the processor, the audio data as input to a first machine learning model to produce transcription data. The audio data is provided via the processor as input to a second machine learning model to produce speaker separation data, and the transcription data is segmented via the processor and based on the speaker separation data to produce speaker separated transcription data. The method also includes providing, via the processor, a portion of the speaker separated transcription data as input to a third machine learning model to identify personal identifiable information (PII) text in the portion of the speaker separated transcription data, the portion being associated with a speaker from a plurality of speakers. In response to identifying the PII text, the method includes (1) replacing, via the processor, the PII text with redaction text in the portion of the speaker separated transcription data and (2) causing, via the processor, display of the transcription data including the redaction text at a user compute device.

In some implementations, the redaction text can be first redaction text, and the method can further include receiving, via the processor and from the user compute device, a redaction request associated with a portion of the transcription data. The method can also include replacing, via the processor, the portion of the transcription data with second redaction text. In some implementations, the causing display of the transcription data including the redaction text at the user compute device can include causing display of the transcription data such that the user compute device is unable to revert the redaction text to view the PII text via the user compute device. In some implementations, the providing the portion of the speaker separated transcription data as input to the third machine learning model can include (1) generating, via the processor, a plurality of segments based on the speaker separated transcription data and (2) iteratively providing, via the processor, each segment from the plurality of segments as input to a context window of the third machine learning model to identify the PII text. In some implementations, the audio data can be included in video data that is generated by a body worn camera.

According to an embodiment, a method includes receiving audio data via a processor and providing the audio data as input via the processor to a first machine learning model to produce transcription data. The method also includes providing the audio data via the processor as input to a second machine learning model to produce speaker separation data. The transcription data is segmented, via the processor, based on the speaker separation data to produce speaker separated transcription data. A portion of the speaker separated transcription data is provided via the processor as input to a context window of a third machine learning model to produce an attribute indication, the second portion (1) being associated with a speaker from a plurality of speakers and (2) not being associated with remaining speakers from the plurality of speakers. In response to producing the attribute indication, the method includes causing, via the processor, display of video data at a user compute device, the video data being associated with the audio data.

In some implementations, the attribute indication can be associated with a speaker specific attribute. In some implementations, the method can further include (1) receiving, via the processor and from the user compute device, an invalidation request; (2) deleting, via the processor, the attribute indication in response to the receiving the invalidation request; and (3) generating, via the processor, audit data that includes an indication of the invalidation request. In some implementations, the method can further include (1) receiving, via the processor, a confirmation indication from the user compute device in response to the causing display of the video data; and (2) associating, via the processor, a label with the video data, the label being associated with the attribute indication. In some implementations, the method can further include causing, via the processor, a training signal to be sent to retrain the third machine learning model based on a user confirmation of the attribute indication.

In some implementations, the portion of the speaker separated transcription data can be a first portion of the speaker separated transcription data, the speaker can be a first speaker, and the providing the first portion of the speaker separated transcription data as input to the context window of the third machine learning model can include providing a second portion of the speaker separated transcription data as input to the context window of the third machine learning model to produce the attribute indication. The second portion can be associated with a second speaker from the plurality of speakers, and the attribute indication can be a conversation attribute indication.

In some implementations, the third machine learning model can include (1) a first large language model (LLM) configured to receive the first portion of the speaker separated transcription data as input to produce a speaker specific attribute indication and (2) a second LLM configured to receive the second portion of the speaker separated transcription data as input to produce the conversation attribute indication. In some implementations, the first speaker can be a law enforcement officer, and the second speaker can be a community member.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a processor; and
a memory operably coupled to the processor, the memory storing instructions to cause the processor to:
  receive video data that includes audio data,
  provide the audio data as input to a first machine learning model to produce transcription data,
  provide the audio data as input to a second machine learning model to produce speaker separation data,
  segment the transcription data based on the speaker separation data to produce speaker separated transcription data,
  provide a first portion of the speaker separated transcription data from a plurality of portions of the speaker separated transcription data as input to a context window of a third machine learning model to produce an attribute indication, the first portion (1) being associated with a first speaker from a plurality of speakers and (2) not being associated with remaining speakers from the plurality of speakers,
  in response to producing the attribute indication, cause display of video data at a user compute device, the video data being associated with the first portion of the speaker separated transcription data and not remaining portions of the speaker separated transcription data from the plurality of portions of the speaker separated transcription data,
  provide at least one of the first portion of the speaker separated transcription data or a second portion of the speaker separated transcription data as input to a fourth machine learning model to identify personal identifiable information (PII) text in the at least one of the first portion of the speaker separated transcription data or the second portion of the speaker separated transcription data, the second portion being associated with a second speaker from the plurality of speakers, and
  in response to identifying the PII text:
    replace the PII text with redaction text in the at least one of the first portion of the speaker separated transcription data or the second portion of the speaker separated transcription data, and
    cause display of the transcription data including the redaction text at the user compute device.

2. The apparatus of claim 1, wherein:
the first speaker is a peace officer; and
the second speaker is a civilian.

3. The apparatus of claim 1, further comprising an interface configured to communicate with a body camera, the video data being received from the body camera.

4. The apparatus of claim 1, wherein:
the third machine learning model includes (1) a first large language model (LLM) configured to receive the first portion of the speaker separated transcription data as input to produce a speaker specific attribute indication and (2) a second LLM configured to receive the first portion of the speaker separated transcription data and the second portion of the speaker separated transcription data as input to produce a conversation attribute.

5. The apparatus of claim 1, wherein the memory further stores instructions to cause the processor to:
receive a confirmation indication from the user compute device in response to the processor causing display of the video data; and
generate a label for the video data, the label being associated with the attribute indication.

6. The apparatus of claim 5, wherein the memory further stores instructions to cause the processor to cause a training signal to be sent to retrain the third machine learning model based on the confirmation indication.

7. The apparatus of claim 1, wherein the memory further stores instructions to cause the processor to:
receive a rejection indication from the user compute device in response to the processor causing display of the video data; and
cause a training signal to be sent to retrain the third machine learning model based on the rejection indication.

8. The apparatus of claim 1, wherein the memory further stores instructions to cause the processor to:
cause display of the first portion of the speaker separated transcription data at the user compute device;
in response to producing the attribute indication, cause display of a tag that (1) is associated with the attribute indication and (2) highlights the first portion of the speaker separated transcription data at the user compute device;
cause display of an identifier associated with the first speaker; and
cause display of a selectable element associated with at least one of a confirmation indication or a rejection indication.

9. The apparatus of claim 1, wherein the instructions to cause the processor to cause display of the video data at the user compute device include instructions to cause the processor to add the video data to a selectable queue that is associated with the attribute indication.

10. A method, comprising:
receiving, via a processor, audio data;
providing, via the processor, the audio data as input to a first machine learning model to produce transcription data;
providing, via the processor, the audio data as input to a second machine learning model to produce speaker separation data;
segmenting, via the processor, the transcription data based on the speaker separation data to produce speaker separated transcription data;
providing a first portion of the speaker separated transcription data from a plurality of portions of the speaker separated transcription data as input to a context window of a third machine learning model to produce an attribute indication, the first portion (1) being associated with a first speaker from a plurality of speakers and (2) not being associated with remaining speakers from the plurality of speakers;
in response to producing the attribute indication, causing display of video data at a user compute device, the video data being associated with the first portion of the speaker separated transcription data and not the remaining portions of the speaker separated transcription data;
providing, via the processor, at least the first portion of the speaker separated transcription data or a second portion of the speaker separated transcription data as input to a fourth machine learning model to identify personal identifiable information (PII) text in the at least one of the first portion of the speaker separated transcription data or the second portion of the speaker separated transcription data, the second portion being associated with a second speaker from the plurality of speakers;
replacing, via the processor, the PII text with redaction text in the at least one of the first portion of the speaker separated transcription data or the second portion of the speaker separated transcription data; and
causing, via the processor, display of the transcription data including the redaction text at the user compute device.

11. The method of claim 10, wherein the redaction text is first redaction text, the method further comprising:
receiving, via the processor and from the user compute device, a redaction request associated with a portion of the transcription data; and
replacing, via the processor, the portion of the transcription data with second redaction text.

12. The method of claim 10, wherein the causing display of the transcription data including the redaction text at the user compute device includes causing display of the transcription data such that the user compute device is unable to revert the redaction text to view the PII text via the user compute device.

13. The method of claim 10, wherein the providing the at least one of the first portion of the speaker separated transcription data or the second portion of the speaker separated transcription data as input to the fourth machine learning model includes:
generating, via the processor, a plurality of segments based on the at least one of the first portion of the speaker separated transcription data or the second portion of the speaker separated transcription data; and
iteratively providing, via the processor, each segment from the plurality of segments as input to a context window of the fourth machine learning model to identify the PII text.

14. The method of claim 10, wherein the audio data is included in video data that is generated by a body worn camera.

15. A method, comprising:
receiving, via a processor, audio data;
providing, via the processor, the audio data as input to a first machine learning model to produce transcription data;
providing, via the processor, the audio data as input to a second machine learning model to produce speaker separation data;
segmenting, via the processor, the transcription data based on the speaker separation data to produce speaker separated transcription data;

providing, via the processor, a first portion of the speaker separated transcription data from a plurality of portions of the speaker separated transcription data as input to a third machine learning model to produce an attribute indication, the first portion of the speaker separated transcription data (1) being attributable to a law enforcement officer from a plurality of speakers and (2) not being associated with remaining speakers from the plurality of speakers;

causing, via the processor, display of video data at a user compute device, the video data being associated with the first portion of the speaker separated transcription data and not remaining portions of the speaker separated transcription data from the plurality of portions of the speaker separated transcription data;

providing, via the processor, at least the first portion of the speaker separated transcription data or a second portion of the speaker separated transcription data as input to a fourth machine learning model to identify personal identifiable information (PII) text in the at least one of the first portion of the speaker separated transcription data or the second portion of the speaker separated transcription data, the second portion being attributable to a community member;

replacing, via the processor, the PII text with redaction text in the at least one of the first portion of the speaker separated transcription data or the second portion of the speaker separated transcription data; and causing, via the processor, display of the transcription data including the redaction text at the user compute device.

16. The method of claim 15, wherein the attribute indication is associated with a speaker specific attribute.

17. The method of claim 15, further comprising:
receiving, via the processor and from the user compute device, an invalidation request;
deleting, via the processor, the attribute indication in response to the receiving the invalidation request; and
generating, via the processor, audit data that includes an indication of the invalidation request.

18. The method of claim 15, further comprising:
receiving, via the processor, a confirmation indication from the user compute device in response to the causing display of the video data; and
associating, via the processor, a label with the video data, the label being associated with the attribute indication.

19. The method of claim 15, further comprising causing, via the processor, a training signal to be sent to retrain the third machine learning model based on a user confirmation of the attribute indication.

20. The method of claim 15, wherein:
the providing the first portion of the speaker separated transcription data as input to the third machine learning model includes providing the second portion of the speaker separated transcription data as input to the third machine learning model to produce the attribute indication, the attribute indication being a conversation attribute indication.

21. The method of claim 20, wherein the third machine learning model includes (1) a first large language model (LLM) configured to receive the first portion of the speaker separated transcription data as input to produce a speaker specific attribute indication and (2) a second LLM configured to receive the second portion of the speaker separated transcription data as input to produce the conversation attribute indication.

* * * * *